(12) United States Patent
Sederl et al.

(10) Patent No.: US 8,820,480 B2
(45) Date of Patent: Sep. 2, 2014

(54) COMPRESSED AIR LUBRICATOR

(75) Inventors: Christian Sederl, Markt Plesting (AT);
Erich Bauregger, Gloggnitz (AT)

(73) Assignee: Parker-Origa Pneumatik GmbH,
Weiner Neustadt (AT)

( * ) Notice: Subject to any disclaimer, the term of this patent is extended or adjusted under 35 U.S.C. 154(b) by 562 days.

(21) Appl. No.: 13/139,833

(22) PCT Filed: Dec. 15, 2009

(86) PCT No.: PCT/EP2009/008983
§ 371 (c)(1),
(2), (4) Date: Sep. 13, 2011

(87) PCT Pub. No.: WO2010/072356
PCT Pub. Date: Jul. 1, 2010

(65) Prior Publication Data
US 2012/0061186 A1    Mar. 15, 2012

(30) Foreign Application Priority Data
Dec. 15, 2008 (AT) .................................... 1948/2008

(51) Int. Cl.
*F16N 7/34* (2006.01)
(52) U.S. Cl.
CPC ......................................... *F16N 7/34* (2013.01)
USPC ........................................................ 184/55.2
(58) Field of Classification Search
CPC ........................................................ F16N 7/34
USPC .................................. 184/55.1, 55.2; 261/78.2
See application file for complete search history.

(56) References Cited

U.S. PATENT DOCUMENTS

| | | | |
|---|---|---|---|
| 2,367,721 A | | 1/1945 | Gothberg et al. |
| 2,565,691 A | | 8/1951 | Ketelsen |
| 2,710,672 A | | 6/1955 | Costes |
| 2,913,234 A | | 11/1959 | Beaurline |
| 3,605,949 A | | 9/1971 | Vock |
| 5,232,164 A | * | 8/1993 | Resch et al. ................... 239/434 |
| 6,145,627 A | * | 11/2000 | Wada ............................... 184/57 |
| 6,328,227 B1 | * | 12/2001 | Kuther .......................... 239/369 |

FOREIGN PATENT DOCUMENTS

| | | |
|---|---|---|
| EP | 0122602 A2 | 12/1984 |
| FR | 1498630 | 9/1966 |

* cited by examiner

*Primary Examiner* — William E Dondero
*Assistant Examiner* — Robert T Reese
(74) *Attorney, Agent, or Firm* — Thomas G. Fistek

(57) ABSTRACT

The invention relates to a compressed air lubricator comprising a casing (1) having a flow channel (2) for the compressed air and an oil container (3), whereby the flow channel (2) has a constriction (4) as well as at least one connection (6, 7) with the oil container (3) and an atomizer unit (8) connected to the constriction (4) is provided.

Figure 2:
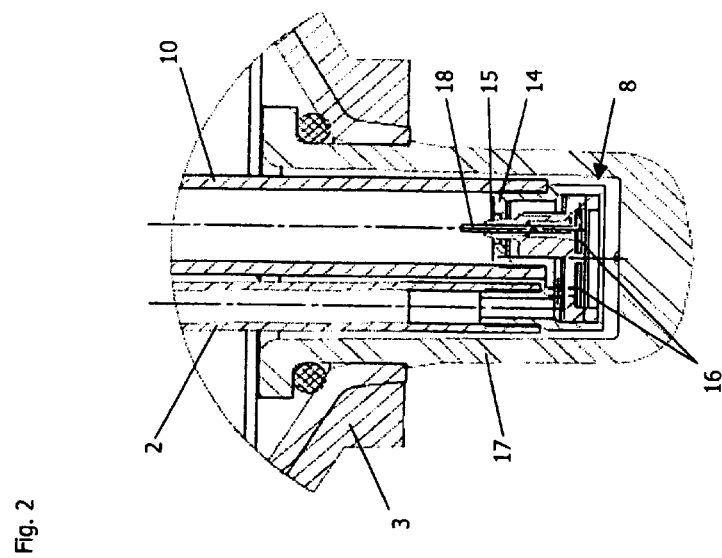

In order to guarantee a constant conveyed oil quantity over a large range in terms of air flow and to provide a long transport length through a very fine oil mist, it is envisaged that the atomizer unit (8) arranged on the base of the oil container (3) and having outlet nozzles (15) for air and oil supply holes (16) is supplied with air via a tube (9) exiting from the flow channel (2) before its constriction (4), with a pipe (10) running from the atomizer unit (8) and opening into the constriction (4) for taking up and introducing the oil mist into the flow channel (2).

5 Claims, 1 Drawing Sheet

COMPRESSED AIR LUBRICATOR

The invention relates to a compressed air lubricator with a casing having a flow channel for the compressed air and an oil container, whereby the flow channel has a constriction as well as at least one connection with the oil container and is provided with an atomiser unit which is connected to the constriction.

One of the known construction principles for oil mist apparatuses involves atomising the oil not directly into the air flow, but into the oil container, whereby the pressure difference in accordance with the injector principle for transporting the oil is brought about by the air flowing past the atomiser nozzle at high speed. In order to separate larger oil droplets the oil mist flow is deflected at an impact plate before being introduced into the main air flow.

Through a differential pressure the known series ALD600/900 devices by SMC produce air bubbles in the oil, which burst on emerging at the oil level thereby releasing an aerosol, so that there is no direct atomisation. The resulting very fine oil mist is then introduced into the main air flow. The thus achievable quantity of oil in the main air flow is very small, and is by far not enough for vane-type air motors for example.

The Norgren Micro-Fog Lubricator employs the principle that an oil droplet falls into the main flow channel, atomises and too large droplets are removed via a droplet separator. As with all devices based on the droplet principle this has the drawback that the oil quantity contained in the oil mist, and therefore also given off to the consumers, pulses.

In EP 65 915 AI a device is disclosed in which compressed air tapped from the flow channel is introduced by a pipe into the storage container for the lubricating oil and mixes with it there. The resulting air-oil mixture is supplied to an atomiser unit which is arranged on the base of an atomiser chamber and via this is fed into the atomiser chamber. From the atomiser chamber the air-oil mixture is introduced into the flow chamber via a hole which opens into the constriction of the flow channel.

The object of the present invention is to provide a compressed air lubricator which over a very large range in terms of air flow guarantees a constant quantity of oil and through a very fine oil mist a large transport length.

This object is achieved, including advantageous embodiments and further developments of the invention by way of the content of the patent claims which follow this description.

The basic principle of the invention envisages as that an atomiser unit arranged on the base of the oil container and having outlet nozzles for air and oil supply holes, is supplied with air via a tube exiting from the flow channel before its constriction, with a pipe running from the atomiser unit and opening into the constriction for taking up and introducing the oil mist into the flow channel. In this way, in contrast to droplet lubricators, continuous oil movement into the main air flow is guaranteed without undesirable adjustment of the oil quantity being possible from outside. Even very small to moderate oil quantities (1 mg/m$^3$ to 100 mg/m$^3$) can be reliably conveyed.

In accordance with a first form of embodiment a baffle plate with at least one elastically deflectable section is arranged in the constriction whereby the tube to the atomiser unit starts from before this baffle plate.

Advantageously it can be envisaged that this constriction is designed as a Venturi valve. This allows a high degree of efficiency as apart from the Venturi valve and the baffle plate there is no other obstacle to the flow in the main air channel.

Advantageously it is envisaged that the pipe for the oil mist opens out directly behind the baffle plate.

If in accordance with another alternative feature of the invention a droplet separator is arranged in the pipe for the oil mist, the continuous oil supply with a very fine oil mist being transportable over great distance into the main air flow can be guaranteed.

Advantageously the droplet separator is formed by an impact plate provided with holes with a defined opening and a deflector for the oil mist.

In accordance with an advantageous form of embodiment of the invention the oil supply holes of the atomiser unit are designed as ring nozzles which in the middle have a laterally freely moving pintle. In this way the compressed air lubricator is also protected against back flow so that in the event of venting against the flow direction during normal operation no excessive oil conveyance occurs.

In the following description the invention will be described below in more detail with the aid of an advantageous example of embodiment shown in the drawing.

Figure 1:
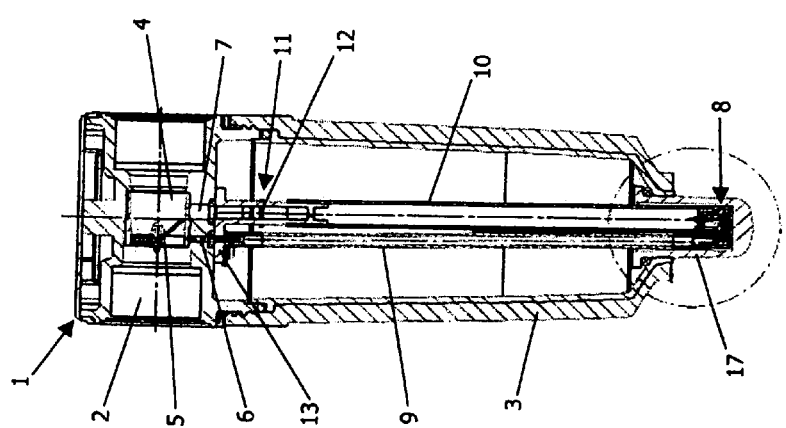

FIG. 1 shows a cross-section through a compressed air lubricator in accordance with the invention and FIG. 2 shows the lower section of the oil container with the atomiser unit in an enlarged scale.

The example of embodiment of a compressed air lubricator shown in FIG. 1 shows a casing 1 with the flow channel 2 for the compressed air. Attached thereto is the oil container 3.

In the flow channel 2 there is a constriction preferably in the form of a Venturi valve 4, advantageously with a baffle plate 5. The baffle plate 5 advantageously has an elastically deflectable part, which brings about an essentially constant pressure difference over a very large pressure range. In the flow direction before the Venturi valve 4 and before a corresponding baffle plate 5 there is a connection point 6 between the flow channel 2 and container 3. In the constriction of the Venturi valve 4 there is a second connection point 7 between the flow channel 2 and container 3. Both connections 6, 7 can preferably be closed by a slide 13.

Both connection points 6, 7 are connected to an atomiser unit 8 which is shown in larger scale in FIG. 2. From the first connection point 6 a tube 9 leads to the atomiser unit which is connected by an essentially rigid pipe 10 to the second connection point 7, whereby the pipe 10 also mechanically bears and fixates the atomiser unit 8. In the upper section of the pipe 10 leading from the atomiser unit 8 to the second connection point 7 a droplet separator 11 is arranged shortly before the transition to the casing 1.

The atomiser unit 8 is arranged at the deepest point of the container 3, preferably in an oil-level glass 17 in order to be able to monitor the function from outside, and comprises a nozzle plate 14 which has one or more air nozzles 15 and one or more oil supply holes 16. The oil supply holes 16 are in the form of ring nozzles which in the middle have a laterally freely movable pintle 18, which on the one hand restricts the oil flow and on the other hand through its movability prevents blocking of the nozzle.

If compressed air flows through the lubricator, a pressure difference is produced by the Venturi valve 4 and in all events the baffle plate 5 between the container 3 and the flow channel 2. From the connection point 6 air now flows via the tube 9 into the atomiser unit 8. The air emerging from the nozzles 15 first forces the oil in pipe 10 upwards which then through the lateral openings in the droplet separator 11 flows back into the container 3. The oil mist then produced in the atomiser unit 8 is conveyed with the air flow to the droplet separator 11.

The droplet separator 11 is dimensioned and adjustable so that only an oil mist with droplets up to a certain mass are transported further. All separated droplets fall back into the oil container 3. For this the droplet separator 11 has an impact plate 12 which the droplets whirled up from the atomiser unit 8 hit. The impact plate 12 laterally deflects the air flow to outside the pipe 10 and above the impact plate 12 the air enters the pipe 10 again and then reaches connection point 7 where the oil mist is introduced into the flow channel 2. The dimensions of the lateral deflection and length of the opening in the pipe 10 determine the number and size of the separated droplets. Depending on the conveyed quantity of oil, the impact plate 12 can be provided with one or more holes.

By means of an appropriate sleeve which can be mounted and moved over the inlet opening into the pipe 10 about the impact plate, the cross-section of the inlet opening for re-entry of the air flow with oil droplets into the pipe 10 can also be altered. In this way further dosing of the oil mist fed into the main air flow via connection point 7 is possible.

The compressed air lubricator in accordance with the invention has the additional advantage that refilling of the oil container 3 during operation is possible. While the entire system is under pressure oil can be filled into the container 3. For this, a filling screw on casing 1 is turned by less than one turn, preferably about 90° to rest against a stop. During this rotation a pin arranged eccentrically on the lower end of the filling screw moves the slide 13, which closes off the connection points 6, 7 of the flow channel 2 to the container 3. Just before the stop is reached the pressure in the container 3 is released into the atmosphere. The stop which has limited the rotation of the filling screw is then pressed downwards whereby the filling screw is turned by a further distance, preferably another 90°, and can be pulled out of the casing 1. Oil can now be filled into the pressure-free container 3. The filling screw is then inserted back into the casing 1 and turned back via the stop. During this rotation the lubricator is made pressure-tight again and the connection points 6, 7 to the flow channel 2 are again opened by the slide 13 so that the container 3 is pressurised again.

The invention claimed is:

1. A compressed air lubricator with comprising:
   a casing having a flow channel for compressed air and an oil container, wherein the flow channel has a constriction and a connection with the oil container,
   an atomiser unit connected to the constriction and arranged on a base of the oil container, the atomizer unit having an outlet nozzle for air and oil supply holes,
   wherein the atomizer unit is supplied with air via a tube to the atomizer unit that exits the flow channel before the constriction,
   a pipe for taking up and intruding the oil mist into the flow channel, the pipe running from the atomiser unit to an opening into the constriction,
   a droplet separator arranged in the pipe, the droplet separator including an impact plate provided with holes and a deflector for the oil mist.

2. The compressed air lubricator of claim 1, further comprising a baffle plate with at least one elastically deflectable section, the baffle plate arranged in the constriction, wherein the tube to the atomiser unit exits the flow channel before the baffle plate.

3. The compressed air lubricator of claim 2, wherein characterised in that the pipe for taking up and supplying the oil mist opens into the constriction immediately after the baffle plate.

4. The compressed air lubricator of claim 1, wherein the constriction comprises a Venturi valve.

5. The compressed air lubricator of claim 1, wherein the oil inlet holes of the atomiser unit comprise as ring nozzles which in the middle have laterally freely movable pintles.

\* \* \* \* \*